Nov. 6, 1962 E. C. FLOYD 3,062,915

COMBINED TELEVISION RECEIVER AND SOUND SYSTEM

Filed Jan. 13, 1961 2 Sheets-Sheet 1 non-radio sound source

INVENTOR.
Earl C. Floyd
BY
James T. Barr
ATTY.

Nov. 6, 1962 E. C. FLOYD 3,062,915

COMBINED TELEVISION RECEIVER AND SOUND SYSTEM

Filed Jan. 13, 1961 2 Sheets-Sheet 2

INVENTOR.
Earl C. Floyd
BY
James T. Barr
ATTY

United States Patent Office 3,062,915

Patented Nov. 6, 1962

3,062,915

COMBINED TELEVISION RECEIVER AND SOUND SYSTEM

Earl C. Floyd, Westchester, Ill., assignor to Admiral Corporation, Chicago, Ill., a corporation of Delaware Filed Jan. 13, 1961, Ser. No. 82,574

6 Claims. (Cl. 178—5.8)

Figure 1:
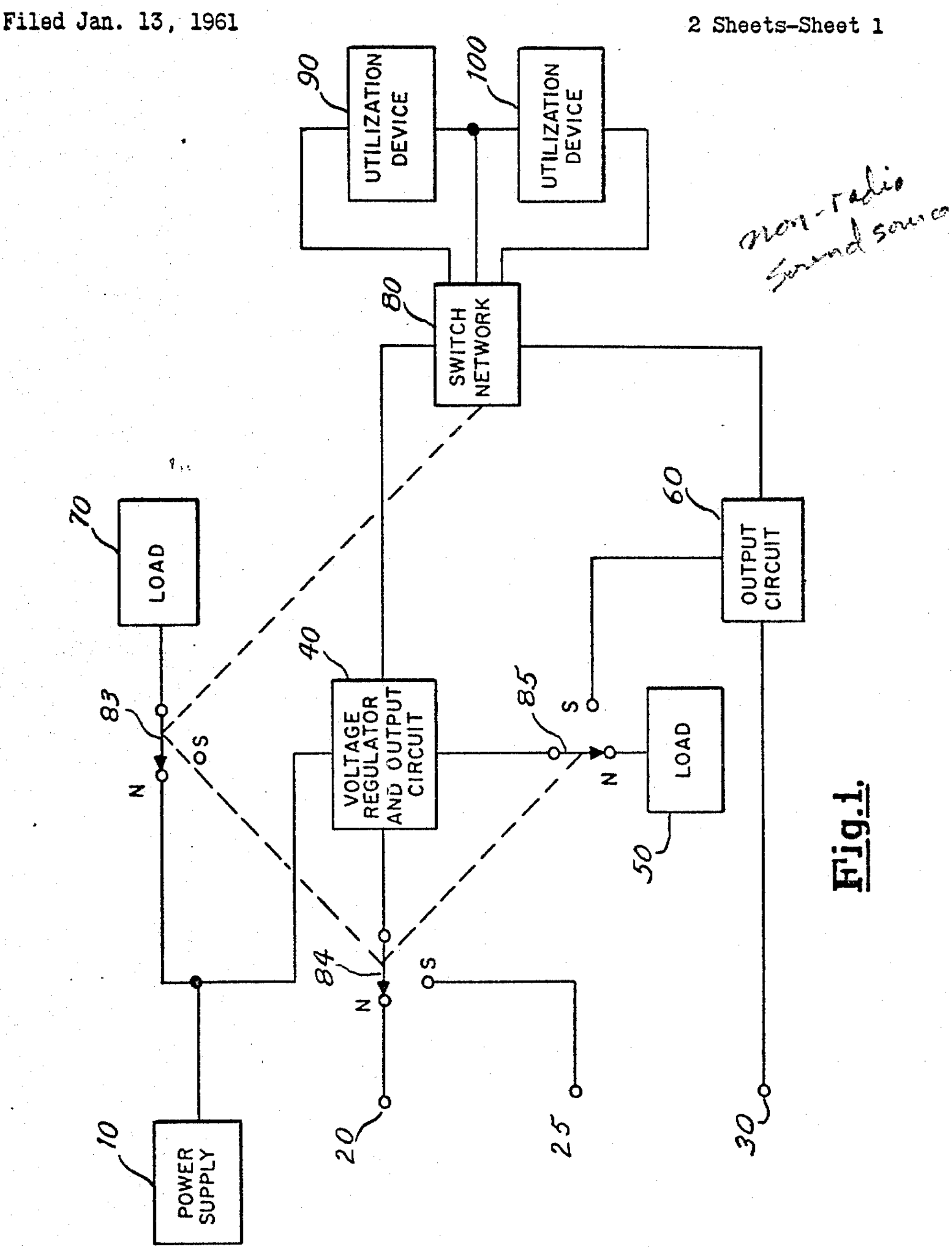

This invention relates in general to a combination voltage regulator and audio output circuit for a television receiver and in particular to such an arrangement in a television receiver which is adapted to have other program sources fed therethrough.

With the recent public acceptance of stereophonic transducing equipment and the duplication of components required, added emphasis has been placed on the use of conventional radio or television receivers as one audio channel therein. In particular, many combination television receiver and stereophonic sound systems are being marketed.

The invention relates to such systems and provides economical means for utilizing the audio section of a television receiver as one channel of a two channel transducing system. It is also desirable, in a sound system to provide for somewhat larger power outputs than are normally available in a conventional radio or television receiver. Hence in sound systems, audio output tubes of high power handling capabilities are usually employed. The invention incorporates such an output tube as a combination output stage for the television receiver sound section and voltage regulator. The voltage regulator supplies operating voltage for certain stages in the television receiver which optimally require a regulated power source of lower voltage than that normally supplied by the television power supply.

According to the invention, this output tube has a certain audio power output associated with it when the combination receiver is used in the television mode. When the combination receiver is switched for operation in the sound system mode, the regulated television tubes are disconnected from the output tube and another, similar output tube is connected in series therewith across the power supply. Both tubes function as independent audio output tubes in separate audio channels. Additionally, the B+ voltage to the remaining television tubes is disconnected, resulting in a lower current drain on the receiver power supply, thus causing an increase in the supply voltage available. This higher supply voltage, applied across the series connected output tubes, results in both output tubes having a much larger maximum power output capability.

Quite obviously, for a two channel audio system, two separate speaker systems are required. These speaker systems are utilized in a manner whereby both are available for operation, whether the combination receiver is operating in the television mode or in the sound system mode. The arrangement of the speakers and the output transformers associated therewith is such that in either case, that is whether the speakers are being operated from the television set or from the independent channels in the sound system, both speakers are always in phase with each other.

Accordingly it is an object of this invention to provide an improved single channel-multichannel sound system.

Another object of this invention is to provide a combination television receiver and stereophonic reproducing system which is more economical and efficient in operation than other known systems or similar character.

An additional object of this invention is to provide an electronic system utilizing a vacuum tube as a combination power output signal translation device and voltage regulator, which system may readily be converted, in conjunction with another vacuum tube of similar character, to a two channel system with an output signal power capability greater than twice that of the original system.

Figure 2:
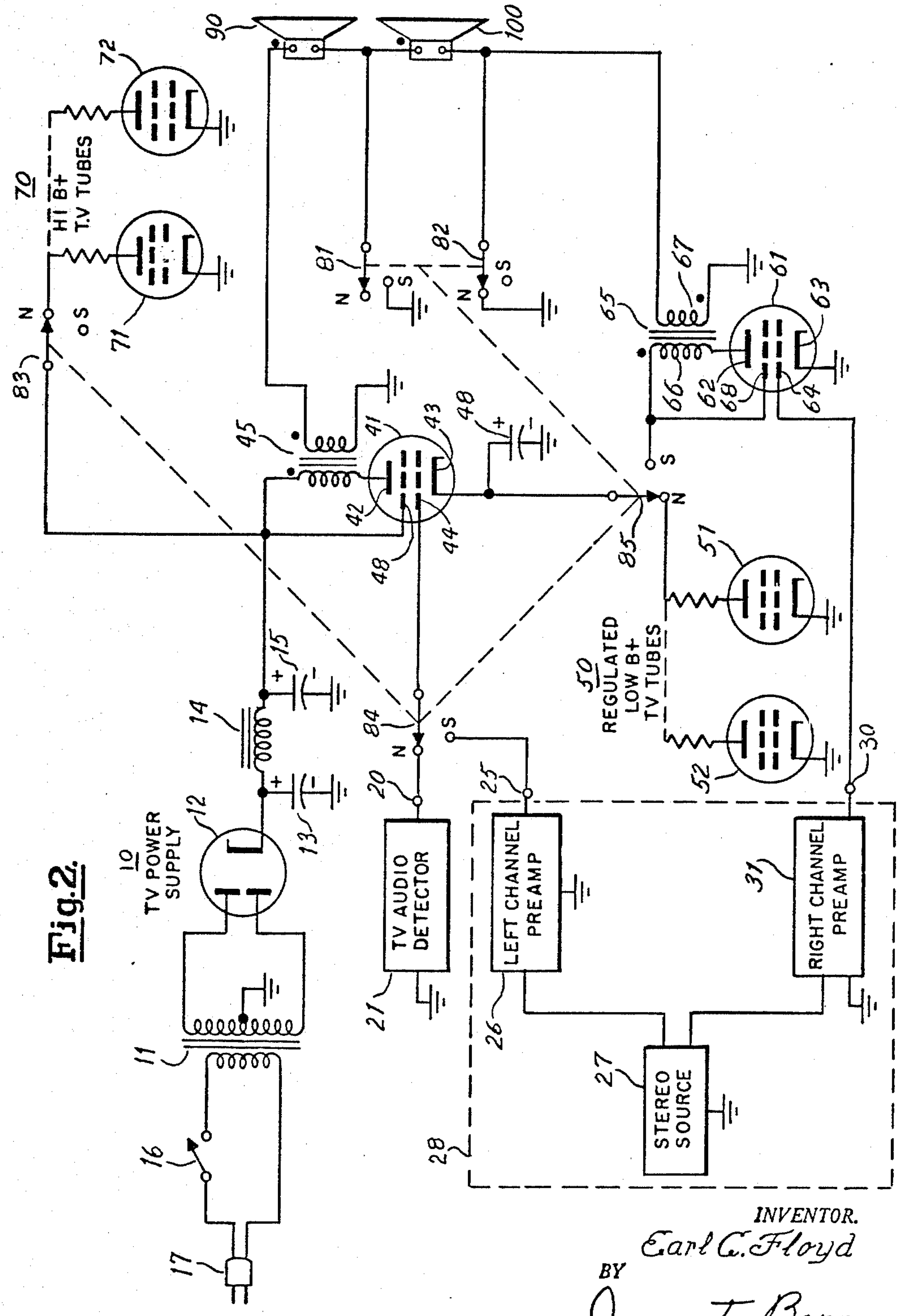

Other objects and features of this invention will become apparent from a reading of the specification taken in conjunction with the drawings in which FIG. 1 is a block diagram of a system incorporating the invention; and FIG. 2 is a partial schematic, partial block diagram of the invention as applied to a combination television receiver and stereophonic reproducing unit.

Referring now to FIG. 1 there is shown a power supply 10 and signal input jacks 20, 25 and 30. The power supply feeds block 40 containing a voltage regulator and output circuit. A load circuit 70 is connected to power supply 10 through a switch 83. Another load circuit 50 is connected to block 40 through a switch 85. Signal input jack 20 is connected to block 40 through a switch 84. Block 40 is also connected to a switching network 80, which is in turn coupled to a pair of utilization devices 90 and 100, respectively. The switches 83, 84 and 85 each have two contacts labelled N and S, respectively. Input jack 25 is connected to contact S of switch 84.

A signal input jack 30 is connected to a block 60, which is normally disconnected by switch 85 from block 40. Block 60 is also connected to switching network 80.

In operation, power supply 10 supplies the requisite power for load 70 directly, and for load 50 indirectly through the voltage regulator in block 40. Signal input 20 is coupled to the output circuit in block 40, which translates impressed signals and couples them via switching network 80, to one or both of utilization devices 90 and 100. Operation of switching network 80 and switches 83 to 85, which it will be noted are ganged together as indicated by the dashed lines interconnecting them, connects the combination receiver for operation in the sound system mode. When these switches are operated, block 40 is connected in series with block 60 across the power supply. Thus, the output circuit in block 60 receives energizing potential.

It will be noted that both load 50 and load 70 are disconnected upon operation of switches 83 and 85. Signal input jack 25 is connected, via switch 84, to block 40. Signal input jack 30, of course, remains connected to block 60. Switching network 80 is arranged in a manner such that, upon operation, utilization device 90 is connected to block 40 and utilization device 100 is connected to block 60. Thus it may be seen that with all switches in the N position, the combination receiver includes a single channel output in conjunction with a regulated load 50 and an unregulated load 70, all of which are supplied from a common power supply 10. With all switches in the S position, two isolated channels are provided with both output circuits therein connected in series across the power supply 10. The functioning of an actual circuit, as outlined in FIG. 1, as well as the unusual results achieved thereby, will now be explained with reference to FIG. 2.

Without limiting the scope of the invention it should be understood that the form most readily adapted for use of the invention is a combination television receiver and stereophonic sound reproducing system. The basic components of such a system are indicated in FIG. 2.

In FIG. 2 power supply 10 comprises a transformer 11, coupled to a rectifier tube 12, and a filter circuit including a capacitor 13, an inductor 14 and a capacitor 15. A connector 17 is provided for connection to a source of normal A.C. house current. A switch 16 is inserted for connecting or disconnecting the power supply with the house current. Signal input jack 20 is fed from the television audio detector 21. Load 70 comprises a plurality of vacuum tubes in the television receiver which require a relatively high B+ potential for operation. Two of these tubes 71 and 72 are shown. Load circuit 50 comprises a plurality of vacuum tubes in the television receiver which require a relatively low B+ potential, and preferably, a regulated potential for optimum operation. Two of these tubes 51 and 52 are shown.

The combination voltage regulator and output circuit 40 is indicated as a tetrode type vacuum tube 41 having an anode 42, a cathode 43, a control grid 44 and a screen grid 48. An output transformer 45 is provided with primary winding 46, connected between power supply 10 and anode 42, and a secondary winding 47 connected between ground potential and one lead of speaker 90. A large electrolytic capacitor 48 is connected between cathode 43 and ground potential. Cathode 43 is also connected to switch 85, which in the N position feeds the aforesaid regulated television tubes. Power supply 10 is also directly connected through switch 83 to the unregulated television tubes.

The other lead of speaker 90 and one lead of speaker 100 are connected to switch 81, which is also normally in the N position. The other lead of speaker 100 is connected to switch 82 and to secondary winding 67 of output transformer 65. Output transformer 65 is associated with output circuit 60 which comprises a vacuum tube 61, similar to tube 41, having an anode 62, a cathode 63, a control grid 64 and a screen grid 68. Anode 62 is connected through primary 66 of output transformer 65 to the S contact of switch 85 and is thus normally deenergized. Signal input jack 30 is connected to control grid 64 of output tube 61.

With all switches in the normal (N) position as shown in FIG. 2, representing operation of the combination receiver in the television mode, tube 41 acts as a voltage regulator for the regulated low B+ television tubes 51 and 52 as well as the sound output amplifier for signals emanating from television audio detector 21. In this operating mode, both speakers 90 and 100 are serially connected across secondary winding 47 of output transformer 45.

The dots adjacent to the various output transformer windings are used to indicate the points on each transformer winding at which the instantaneous voltage polarity is the same. The tiny dots alongside speakers 90 and 100 indicate that like polarity potentials applied to these leads, will cause speaker cone excursions in the same direction. These dots are used frequently in the art to simplify the problem of "phasing" the speakers. That is, to avoid sound cancellation effects and the like, it is necessary that both speaker cones move in the same direction for a given signal.

Power supply 10, as is true of any conventional power supply, has a voltage regulation characteristic associated with it. That is, its terminal potential is dependent to a great degree upon the load current delivered by the power supply.

In the circuit shown, with power supply 10 supplying the entire television receiver, only portions of which are indicated on the drawings, the voltage across tube 41 will be such that about one watt of audio output power will be obtainable. In this connection it should be noted that this relatively low power output capability is deemed sufficient for television since the information in a television program is conveyed primarily through presentation of a picture on the television screen. However, for a sound system, a one watt power output capability is not considered satisfactory for reasons which are well known in the art and consequently will not be discussed herein. Suffice it to say that it is desirable to have larger power outputs available for use in sound systems.

To recapitulate, when the combination receiver is operating in the television mode, that is with all switches resting on the N contacts, tube 41 acts as a combined audio output tube for the television receiver and a voltage regulator for selected low B+ tubes in the television set. Further, in this mode a limited audio output power is available from tube 41 and still further, both speakers 90 and 100 are operatively associated with tube 41 and are in phase with each other so that the monaural or single channel sound is reproduced without deleterious effects.

The dashed line rectangle 28 includes a stereo source 27, which is shown feeding a left channel preamplifier 26 and a right channel preamplifier 31. The outputs of these preamplifiers are connected to signal input jacks 25 and 30, respectively. As is also well known in the art, the components in dashed line rectangle 28 may comprise a stereo record player, a stereo tape recorder, or a stereo FM-AM receiving unit. Monaural components may also be utilized, in which case both channels would carry similar signals.

When the operator wishes to operate the combination receiver in the sound system mode, he merely flicks a switch which changes switches 81 to 85 from the N position to the S position. When this occurs load 70 and load 50 are dropped from the common power supply and output tube 61 is connected in series with output tube 41 across the power supply. Additionally, input jack 25 is connected to control grid 44 of tube 41 and the junction of speakers 90 and 100 is grounded. It will be noted that secondary winding 67 of output transformer 65 is phased oppositely to that of the primary winding 66. This is done because in the sound system mode, speakers 90 and 100 are operated independently and, as mentioned previously, it is necessary for these speakers to be phased such that similar polarity signals give rise to cone excursions in the same direction.

When loads 50 and 70 are disconnected from power supply 10, the voltage available therefrom increases due to the supply's regulation characteristic. In the S position, tubes 41 and 61 are connected in series across power supply 10. Capacitor 48 provides isolation between tubes 41 and 61 just as it provided isolation between tube 41 and the regulated low B+ television tubes when the combination receiver was operating in the television mode. Due to the rise in power supply voltage, the output capabilities of tube 41 and tube 61 are increased to approximately four watts each. Since there are now two independent sound channels, the power output capability of both tubes are added to determine the power output capability of the system. Hence, output capability of eight watts is achieved in the sound system operating mode.

In a practical circuit embodying the invention, tubes 41 and 61 are of the EL86 type, which those skilled in the art will immediately recognize as a desirable tube type for audio output use. This tube type also has a very desirable voltage regulation characteristic in that the anode to cathode voltage drop across the tube is relatively constant over a range of twenty to forty milliamperes anode to cathode current.

It should be noted, of course, that other tube types may be advantageously used. The use of this circuit in a combination television receiver-stereophonic sound system not only results in a marked savings in cost, but provides the desirable features of a regulated source of low B+ potential for critical tubes in the television receiver and more than adequate individual channel power output capability of the stereophonic sound system.

It will be appreciated by those skilled in the art that this invention will find application in many other circuits in which it is desired to have a single channel system requiring a source of regulated potential, with provision for switching to a dual channel system of larger power output. It should also be understood that numerous departures and modifications may be made from the actual circuit shown without departing from the true spirit and scope of the invention as defined in the appended claims.

What is claimed is:

1. In combination in a television receiver; a power supply; a first plurality of vacuum tubes connected to said power supply; an audio output tube connected to said power supply; a second plurality of vacuum tubes connected in series with said audio output tube, said audio output tube acting as a voltage regulator for said second plurality of vaccum tubes; a second audio output tube not normally operative in said television receiver; and switching means for simultaneously disconnecting said first plurality of tubes from said power supply, disconnecting said second plurality of tubes from said first audio output tube and connecting said second audio output tube in series with said first audio output tube.

2. In combination; a power supply; a first load circuit connected across said power supply; a first electron discharge device connected to said power supply; a second load circuit connected in series with said first electron discharge device, said first electron discharge device providing a regulated supply voltage for said second load circuit; a first signal circuit means coupled to said first electron discharge device; a normally deenergized second electron discharge device; a second signal circuit means; a third signal circuit means coupled to said second electron discharge device; and switching means for simultaneously disconnecting said first load circuit from said power supply, disconnecting said second load circuit from said first electron discharge device, energizing said second electron discharge device in series with said first electron discharge device, decoupling said first signal circuit means from said first electron discharge device and coupling said second signal circuit means to said first electron discharge device.

3. In combination; a direct current power supply having a predetermined regulation characteristic; a first load circuit designed for operation at a regulated potential lower than that existing at said power supply; a second load circuit connected directly across said power supply; a first electron discharge device serially connected between said power supply and said first load circuit and providing said regulated potential therefor; a first signal translation channel means including said first electron discharge device; a second electron discharge device, said second discharge device being normally deenergized, a second signal translation channel means including said second electron discharge device; and switching means for disconnecting said first load circuit from said first electron discharge device and connecting said first and said second electron discharge devices in series across said power supply, and for disconnecting said first load circuit from said power supply.

4. The combination set forth in claim 3 wherein said discharge devices are power output stages in their respective translation channel means, said first discharge device being capable of a first power output when acting as a regulator for said first load circuit, and wherein both said discharge devices are capable of substantially larger power outputs when connected in series due to said regulation characteristic of said power supply and disconnection of said load circuits.

5. In a combination television receiver and sterophonic sound system; a direct current power supply having a predetermined regulation characteristic; a first group of electon tubes connected across said power supply; a second group of electron tubes in said receiver desirably operating from a regulated power source of lower voltage than said power supply; a first vacuum tube regulator connected in series between said power supply and said second group of tubes, said first vacuum tube regulator also operating as an audio output tube of said television receiver; a second audio output vacuum tube normally deenergized during operation of said television receiver; switching means for changing from television operation to stereophonic sound operation, said switching means disconnecting said first and second groups of tubes and connecting said first and second vacuum tubes in series across said power supply; and means for feeding a sterophonic signal to said first and second vacuum tubes.

6. In the system set forth in claim 5 wherein said first vacuum tube is capable of a first power output when said television receiver is operating, said power supply regulation characteristic providing a higher voltage when said first and second groups of tubes are disconnected, whereby said first and said second vacuum tubes are both capable of greater sound power outputs when said system is switched to stereophonic sound operation.

References Cited in the file of this patent

UNITED STATES PATENTS

| | | |
|---|---|---|
| 2,610,251 | Torsch | Sep. 9, 1952 |
| 2,654,800 | Tourshou et al. | Oct. 6, 1953 |